3,223,754
ALKYL MERCAPTO ALKYL ESTERS OF SUBSTITUTED PHOSPHONIC ACIDS
Reimer Cölln, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Nov. 29, 1960, Ser. No. 72,305
Claims priority, application Germany, Dec. 4, 1959, F 300,021
13 Claims. (Cl. 260—948)

The present invention relates to and has as its objects new and useful phosphonic acid esters with insecticidal activities and processes for the production thereof. The new compounds of this invention may be represented by the following general formula:

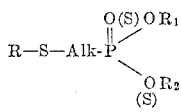

wherein R and $R_1$ stand for alkyl radicals, $R_2$ may be an optional alkyl, aryl, aralkyl or heterocyclic radical and Alk stands for an alkylene chain. In the above formula O(S) stands for oxygen or sulfur or expressed differently, a halogen having an atomic number from 8 to 16.

A member of alkyl-thiono-phosphonic acid esters are distinguished by a good insecticidal action. However, this good insecticidal action is frequently impaired by the fact that the most active representatives have also an especially strong toxic action for warm-blooded animals.

In accordance with the present invention it has now been found that lower alkane-thionophosphonic acid esters of the following Formula I are detoxicated to a great extent when the alkyl group therein is substituted by an alkyl- or aryl-mercapto radical, as it is to be seen from Formula II.

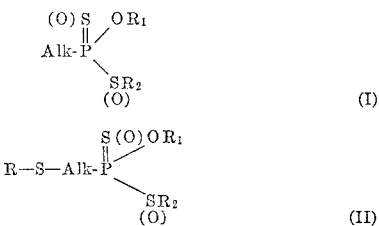

In these formulae the symbols have the same significance as given above.

Simple basical alkylmercapto-alkane-phosphonic acid esters, i.e., substances of the Formula II having a P=O grouping and wherein $R_1$ and $R_2$ are simple unsubstituted lower alkyl radicals, have already been described in the literature. These compounds can easily be produced by reacting α-chloromethyl-phosphonic acid esters with optional substituted mercaptans (see B. A. Arbusow and N. P. Bogonowceva, Z. obsc. Chim., 27 (1957) 2360). This reaction can be seen from the following scheme:

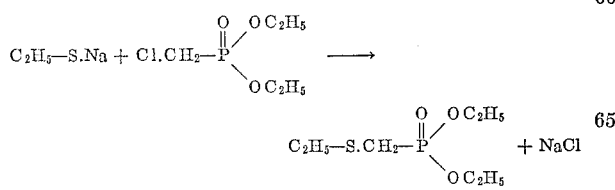

It is, furthermore, also possible to react α-chloromethylthioethers or alkylmercapto-alkyl chlorides by methods known as such with triethyl phosphite (Arbusow reaction) or to react the said alkyl chlorides with sodium dialkyl phosphites (Michaelis-Becker reaction). This may be illustrated by the following reaction schemes:

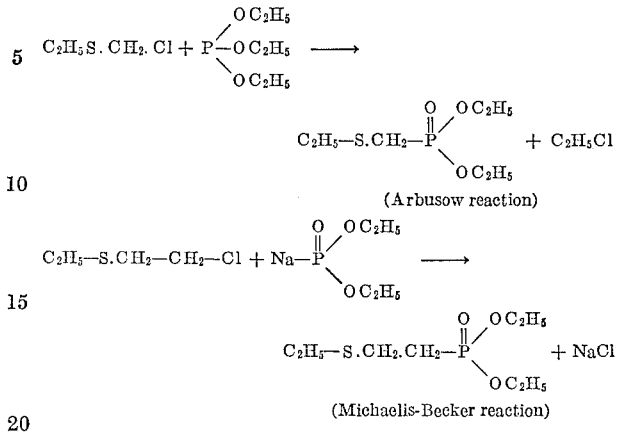

(Arbusow reaction)

(Michaelis-Becker reaction)

The aforementioned known compounds can be easily transformed into the inventive insecticidal compounds. Thus, the alkyl-mercapto-alkane-phosphonic acid esters, obtainable according to the above-mentioned methods, may be converted into the corresponding free acids, e.g., with hydrochloric acid according to known processes. The latter may then be converted without isolation with chlorinating agents, as, e.g., phosphorus pentachloride or thionyl chloride, into the corresponding alkylmercapto-alkanephosphonic acid dichlorides not known as yet. The following scheme may illustrate this:

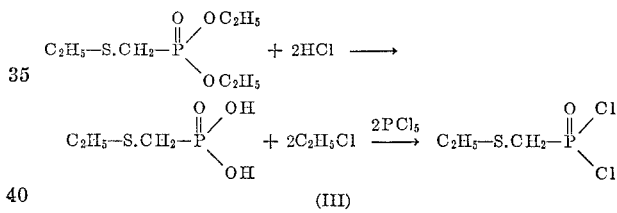

With about the calculated amount of a suitable alcohol in the presence of, for example, a tertiary base, these phosphonic acid dihalides may be converted according to methods known as such into the corresponding ester-chlorides of the following composition:

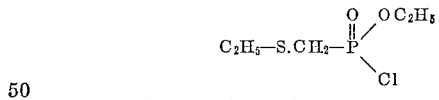

In all the reaction schemes described before, defined chemical compounds are shown. Generally also could have been used other similar compounds.

The alkylmercapto-alkane-phosphonic acid dichlorides, for example the Compound III can also be reacted with phosphorus pentasulphide so that the corresponding alkylmercapto alkane-thionophosphonic acid dichlorides [M. I. Kabachnik and N. M. Godovikow, Ber. d. Akad. d. Wiss. d. UdSSR, 110, 217–219 (1956)] are formed. The latter are then likewise converted into the ester-halides according to known methods. The following scheme may illustrate this procedure:

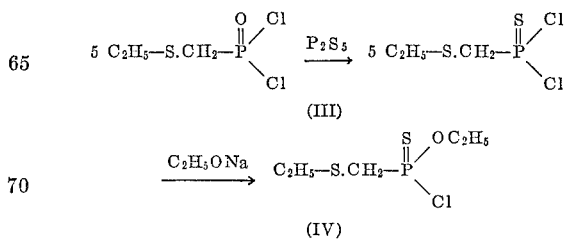

The semiester chlorides (for example, (IV)) may then likewise be reacted in known manner with suitable alcohols, phenols or mercaptans in the presence of acid-binding agents.

As stated above, also here, defined chemical compounds were shown in the formulae, however, broadly, compounds could be used which are represented by the broadest formula shown under No. II in the beginning of this specification.

The new esters formed in this way are distinguished by their outstanding insecticidal action. With regard to warm-blooded animals they are substantially less toxic than the comparable methyl-phosphonic acid esters, as can be seen, for example, from the following table:

$$CH_3-P\begin{array}{c}S\\\|\end{array}\begin{array}{c}OC_2H_5\\\\S.CH_2.CH_2.SC_2H_5\end{array}\quad\text{on rats per os}\quad DL_{95}\ 2.5\ mg/kg$$

$$C_2H_5S.CH_2-P\begin{array}{c}S\\\|\end{array}\begin{array}{c}OC_2H_5\\\\S.CH_2.CH_2.SC_2H_5\end{array}\quad DL_{95}\ 250\ mg/kg$$

$$CH_3-P\begin{array}{c}S\\\|\end{array}\begin{array}{c}OCH_3\\\\O-\langle\bigcirc\rangle-SCH_3\end{array}\quad DL_{95}\ 2.5\ mg/kg$$

$$C_2H_5S.CH_2-P\begin{array}{c}S\\\|\end{array}\begin{array}{c}OCH_3\\\\O-\langle\bigcirc\rangle-SCH_3\end{array}\quad DL_{95}\ 500\ mg/kg$$

Beside this less toxic action, however, many of the inventive compounds additionally show better insecticidal properties than compounds in the phosphoric acid ester field known as yet. The compounds may be used in the same manner as other known phosphoric acid insecticides, i.e., in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the ester of the following formula:

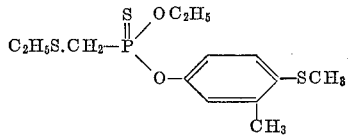

has been tested against aphids and spider mites. Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against aphids (species *Doralis fabae*). Heavily infested bean plants (*Vitia faba*) have been sprayed drip wet with solutions as prepared above in a concentration as shown below. The effect has been determined by evaluation after 24 hours by counting the dead pests either on the surface of the soil or still remaining on the plants. The following results have been obtained: Complete killing has been obtained with 0.01% solutions.

(b) Against spider mites (contact-insecticidal action). Bean plants (*Phaseolus vulgaris*) of about 15 inches height were sprayed drip wet with solutions as prepared above in a concentration as shown below. The bean plants have been infested heavily with the two-spotted spider (species *Tetranychus telarius*). Evaluation has been carried out after 24 hours, 48 hours and 8 days. The following results have been obtained: Spider mites were killed completely with 0.01% solutions.

The following examples are given for the purpose of illustrating the various possibilities of the new process.

*Example 1*

213 g. of ethylmercapto-methane-phosphonic acid diethyl ester (B.P. 87° C./1 mm. Hg) are heated to the boil under reflux with 500 ml. of concentrated hydrochloric acid for 15 hours. The solution is evaporated down under vacuum. In this way, 152 g. of ethylmercapto-methane-phosphonic acid are obtained. 78 g. (0.5 mol) of ethylmercapto-methane-phosphonic acid are suspended in 300 ml. of carbon tetrachloride and gradually treated with stirring at 35° C. with 218 g. of phosphorus pentachloride. The reaction product is heated to the boil for an hour and then fractionated. In this way, 73 g. of ethylmercapto-methane-phosphonic acid dichloride of B.P. 85° C./1 mm. Hg are obtained. Yield: 76% of the theoretical. 386 g. (2 mols) of ethylmercapto-methane-phosphonic acid dichloride are heated with stirring with 94 g. of phosphorus pentasulphide to 120° C. for 2 hours. The resulting ethylmercapto-methane-thionophosphonic acid dichloride is then distilled off from the reaction product under vacuum. 255 g. of B.P. 85–88° C./1 mm. Hg are thus obtained. Yield: 61% of the theoretical.

209 g. (1 mol) of ethylmercapto-methane-thionophosphonic acid dichloride are dissolved in 1000 ml. of benzene. With vigorous stirring and simultaneous external cooling there is added at 0° C. a sodium ethylate solution containing 1 mol of dissolved sodium. The reaction product is subsequently after-stirred at room temperature, until it shows a neutral reaction. The reaction product is then placed into ice-water and the benzene solution separated off. The benzene solution is dried over sodium sulphate and fractionated. In this way, 190 g. of ethylmercapto-methane-thionophosphonic acid-O-ethyl ester chloride of B.P. 92–93° C./1 mm. Hg are obtained. Yield: 87% of the theoretical.

23 g. (0.15 mol) of 3-methyl-4-methylmercapto-phenol are dissolved in 150 ml of benzene. To this solution a sodium ethylate solution is then added which contains 0.15 mol of dissolved sodium. At 60° C., 33 g. of ethylmercapto-methane-thionophosphonic acid-O-ethyl-ester chloride are then added with good stirring. Stirring is continued at 60° for 2 hours. The reaction product is subsequently placed into ice-water. The precipitated oil is taken up with water and dried over sodium sulphate. After distilling off the solvent under vacuum, 49 g. of the new ester of the following constitution:

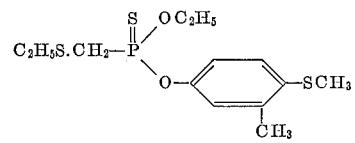

are obtained as a pale brown oil. Yield: 98% of the theoretical.

Calculated for mol 336.5: S, 28.6%; P, 9.2%. Found: S, 28.7%; P, 9.2%.

The LD$_{50}$ toxicity on rats per os is 100 mg./kg.

By the same way there may be obtained the following compounds:

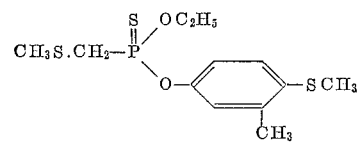

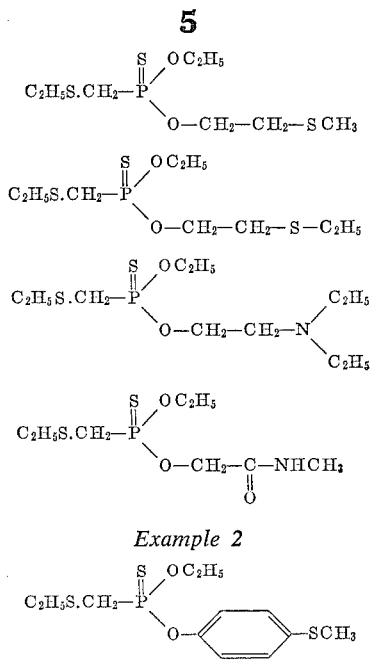

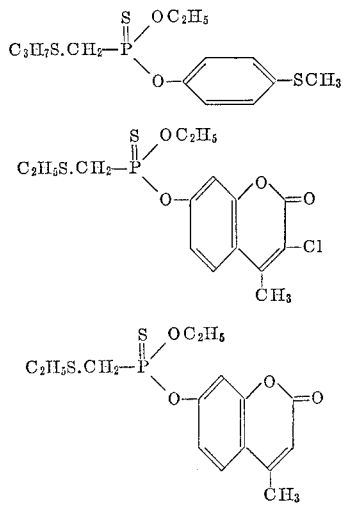

Example 2

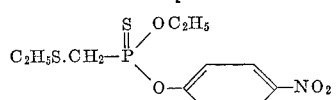

21 g. (0.15 mol) of p-methylmercapto-phenol are dissolved in 150 ml. of benzene. To the benzene solution is added a sodium ethylate solution corresponding to 0.15 mol of sodium. 33 g. of ethylmercapto-methane-thionophosphonic acid-O-ethyl ester chloride are subsequently added with further good stirring at 60° C. The reaction product is kept at 60° C. for another hour and then worked up as described in the preceding example. 39.6 g. of the new ester are thus obtained as a pale brown water-insoluble oil. Yield: 82% of the theoretical.

Calculated for mol 322: S, 29.8%; P, 9.6%. Found: S, 28.4%; P, 9.6%.

The mean toxicity on rats per os is 50 mg./kg.

Spider mites are completely destroyed with 0.01% solutions. 0.1% solutions have a 100% systemic action on aphids.

By the same way there may be obtained the following compounds:

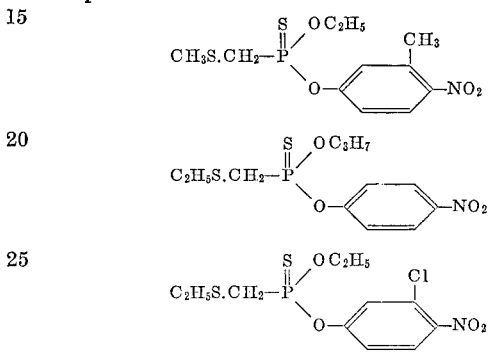

Example 3

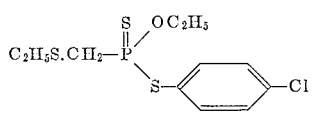

21 g. (0.15 mol) of p-nitrophenol are dissolved in 250 ml. of benzene. A sodium ethylate solution containing 0.15 mol of dissolved sodium is subsequently added. 33 g. of ethylmercapto - methane - thionophosphonic acid-O-ethyl ester chloride are then added dropwise with good stirring at 60° C. The mixture is heated to 60° C. for a further hour and then worked up as described in Example 1. In this way, 43.5 g. of the new ester are obtained as a pale brown water-insoluble oil. Yield: 90% of the theoretical.

Calculated for mol 321: N, 4.4%; S, 19.9%; P, 9.4%. Found: N, 4.5%; S, 18.9%; P, 9.3%.

Mean toxicity on rats per os: 50 mg./kg.

Spider mites are killed with certainty by 0.01% solutions. Caterpillars are completely destroyed by 0.1% solutions.

By the same way there may be obtained the following compounds:

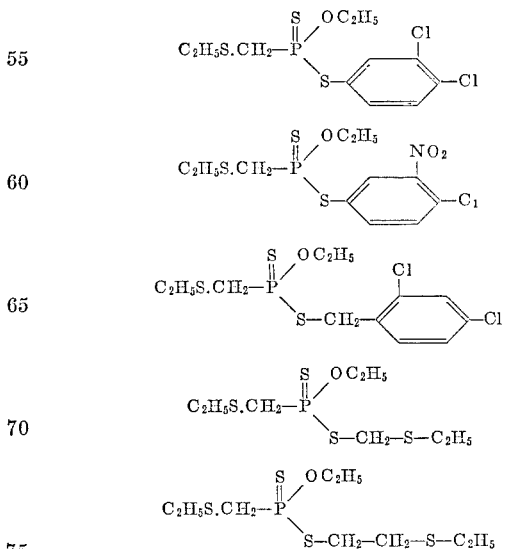

Example 4

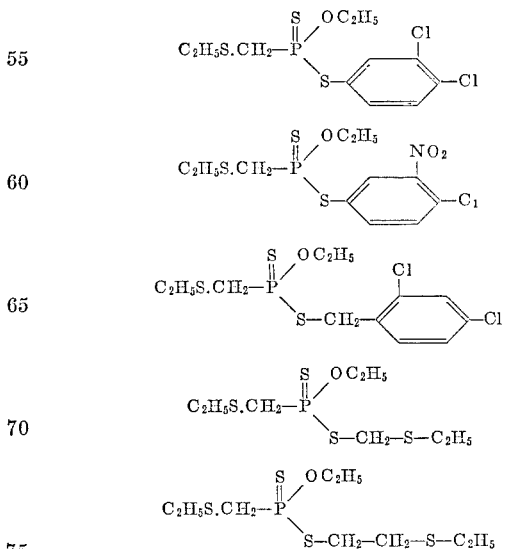

29 g. (0.2 mol) of p-chlorothiophenol are dissolved in 200 ml. of benzene. To this solution a sodium ethylate solution is added which contains 0.2 mol of dissolved sodium. 44 g. of ethylmercapto - methane - thionophosphonic acid-O-ethylester chloride are subsequently added dropwise at 60° C. The reaction product is heated at 60° C. for a further hour and then worked up as described in Example 1. In this way 61 g. of the new ester are obtained as a yellowish water-insoluble oil. Yield: 93% of the theoretical.

Calculated for mol 327: Cl, 10.8%; S, 29.4%; P, 9.5%. Found: Cl, 11.5%; S, 27.7%; P, 8.3%.

Mean toxicity on rats per os: 100 mg./kg.

Spider mites are killed to 100% by 0.01% solutions.

By the same way there may be obtained the following compounds:

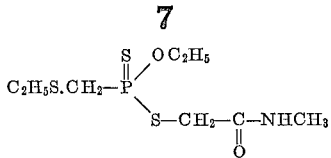

Example 5

Ethylmercapto - methyl - thionophosphonic acid methyl ester chloride.

To a solution of 293 g. of ethylmercapto-methyl-thionophosphonic acid dichloride (1.4 mols) in 1.5 litres of benzene is added dropwise with stirring at 0° C. a sodium methylate solution containing 1.4 mols of dissolved sodium. The mixture is allowed to react at room temperature for 3 hours and then stirred with 1.5 litres of water. The benzene phase is separated off, dried over sodium sulphate and freed from the solvent under vacuum. After distillation under vacuum, the residue yields 246 g. of an almost colorless liquid of B.P. 94° C./1 mm. Hg. Yield: 86% of the theoretical.

Calculated for mol 204.68: P, 15.14; S, 31.33; Cl, 17.32. Found: P, 15.43; S, 31.00; Cl, 17.76.

Example 5A

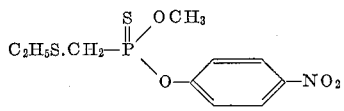

20.9 g. of p-nitrophenol (0.15 mol) are suspended in 250 ml. of benzene and converted into the salt by the dropwise addition of 34.5 g. of a sodium methylate solution (=0.15 mol of Na). At 60° C., 30.8 g. of ethylmercapto-methyl-thionophosphonic acid methyl ester chloride (0.15 mol) are added dropwise with stirring. After stirring at 60° C. for 2 hours and cooling, 8 cc. of water are added and the salt is filtered off. The filtrate is washed with a bicarbonate solution and twice with water, dried and freed from the solvent under vacuum 37.0 g. of a yellowish oil remain as residue which slowly crystallizes completely upon prolonged standing. Yield: 80% of the theoretical.

Calculated for mol 307.32: P, 10.08; S, 20.86; N, 4.56. Found: P, 10.05; S, 20.50; N, 4.34.

By the same way there may be obtained the following compound:

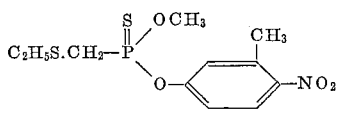

Example 6

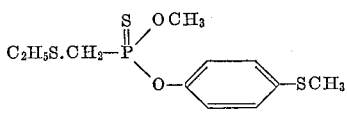

21 g. (0.15 mol) of p-methylmercapto-phenol are dissolved in 150 ml. of benzene. A sodium methylate solution containing 0.15 mol of dissolved sodium is added thereto. At 60° C., 30.7 g. of ethylmercapto-methane-thionophosphonic acid-O-methyl ester chloride (B.P. 100° C./1.5 mm. Hg) are added dropwise with stirring. The mixture is kept at 60° C. for an hour and then worked up as described in Example 1. In this way, 40 g. of the new ester are obtained as a brownish water-insoluble oil. Yield: 86% of the theoretical.

Calculated for mol 308: S, 31.2%; P, 10.0%. Found: S, 30.9%; P, 9.7%.

Mean toxicity on rats per os: 250 mg./kg.

Aphides and spider mites are completely destroyed by 0.01% solutions.

Example 7

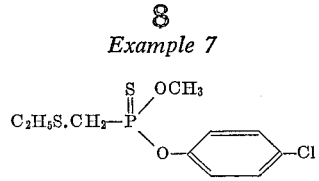

19.3 of p-chlorophenol (0.15 mol) are dissolved in 250 ml. of benzene and further treated as described in Example 5A for p-nitrophenol.

Yield: 42.0 g. of a pale yellowish liquid (94.5% of the theoretical).

Calculated for mol 296.77: P, 10.44; S, 21.61; Cl, 11.95. Found: P, 10.15; S, 20.96; Cl, 11.91.

Example 8

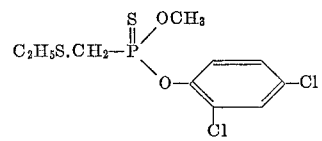

24.4 g. of 2.4-dichlorophenol are dissolved in 250 ml. of benzene. Working up is carried out as described in Example 5A for p-nitrophenol. Yield: 43.0 g. of a pale yellowish liquid (86% of the theoretical).

Calculated for mol 331.21: P, 9.35; S, 19.36; Cl, 21.41. Found: P, 9.40; S, 19.61; Cl, 20.95.

By the same way there may be obtained the following compound:

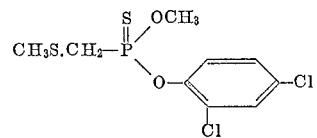

Example 9

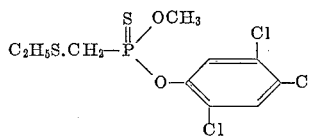

29.6 g. of 2,4,5-trichlorophenol (0.15 mol) are dissolved in 250 ml. of benzene and further treated as described in Example 5A for p-nitrophenol.

Yield: 52.6 g. of a pale yellowish oil (96% of the theoretical).

Calculated for mol 365.67: P, 8.47; S, 17.53; Cl, 29.09. Found: P, 8.23; S, 16.96; Cl, 28.63.

By the same way there may be obtained the following compound:

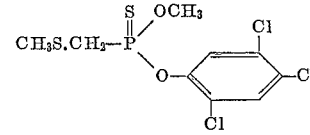

Example 10

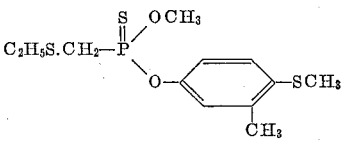

23.2 g. of 3-methyl-4-mercaptophenol (0.15 mol) are dissolved in 250 ml. of benzene. Working up is carried out as described in Example 5A for p-nitrophenol.

Yield: 32.5 g. of a brownish oil (69% of the theoretical).

Calculated for mol 322.43: P, 9.61; S, 29.83. Found: P, 9.50; S, 28.43.

Example 11

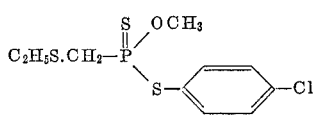

21.7 g. of p-chlorothiophenol are dissolved in 250 ml. of benzene and further treated as described in Example 5A for p-nitrophenol.

Yield: 42.0 g. of a pale yellowish oil (89% of the theoretical).

Calculated for mol 312.83: P, 9.90; S, 30.75; Cl, 11.33. Found: P, 7.10; S, 30.31; Cl, 12.16.

Example 12

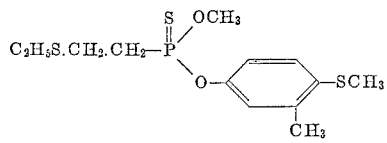

35.7 g. (0.16 mol) of ethylmercapto-ethyl-thionophosphonic acid dichloride are dissolved in 150 cc. of benzene. A sodium methylate solution containing 0.16 mol of dissolved sodium is added dropwise while cooling and stirring at 5° C. After stirring at room temperature for an hour, the mixture is stirred with 150 ml. of water. The organic phase is separated off, dried and freed from the solvent under vacuum. After distillation under vacuum, the residue yields 23.5 g. of ethylmercapto-ethyl-thionophosphonic acid methyl ester chloride as a colorless liquid of B.P. 112° C./1 mm. Hg (67% of the theoretical). 15.5 g. of 3-methyl-4-methylmercaptophenol (0.1 mol) are dissolved in 200 ml. of benzene and converted into the salt by the dropwise addition of the equimolar amount of sodium methylate solution. At 60° C., 22 g. of the above methyl ester chloride are then added dropwise with stirring. After stirring at 60° C. for 2 hours, the product is cooled and filtered. The filtrate is washed with a bicarbonate solution and water and dried. After the complete removal of the solvent under vacuum, 31.0 g. of the new ester are obtained as a yellowish oil (92% of the theoretical).

By the same way there may be obtained the following compounds:

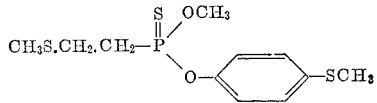

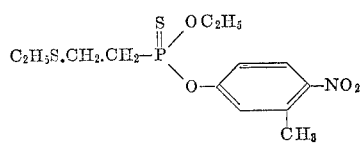

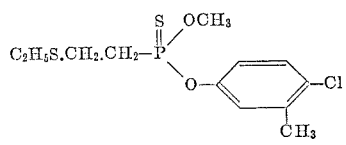

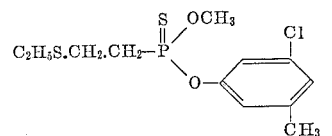

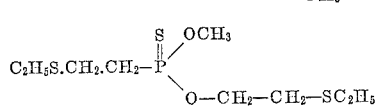

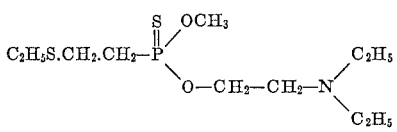

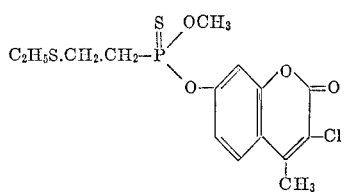

Example 13

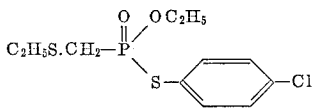

91.5 g. of ethylmercapto-methyl-phosphonic acid dichloride dissolved in 500 ml. of petroleum ether are treated dropwise with vigorous stirring at 0° C. with a mixture of 23.0 g. of ethanol, 75.0 g. of diethyl aniline and 200 cc. of petroleum ether. After the addition, the mixture is further stirred at room temperature for 3–4 hours. After filtration, the solvent is distilled off under vacuum and the residue distilled under vacuum. In this way, 60.4 g. of ethylmercapto-methyl-phosphonic acid ethyl ester chloride are obtained as a colorless liquid of B.P. 92° C./1 mm. Hg (60% of the theoretical).

24.1 g. of p-chlorothiophenol sodium are dissolved in 100 ml. of ethanol and treated dropwise with stirring with 29.5 g. of the above ethyl ester chloride at 25° C. After stirring at room temperature for an hour, the salt is dissolved by the addition of 100 ml. of water and the reaction product shaken out with 100 cc. of chloroform. The organic phase is washed, dried and freed from the solvent under vacuum. In this way, 38.5 g. of the new ester are obtained as a yellowish oil (85% of the theoretical).

By the same way there may be obtained the following compounds:

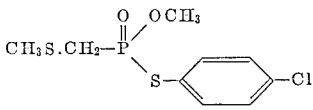

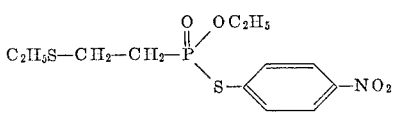

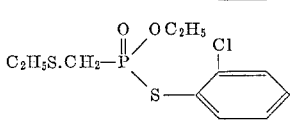

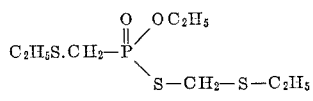

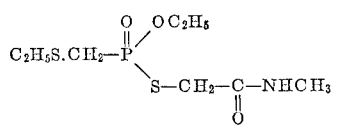

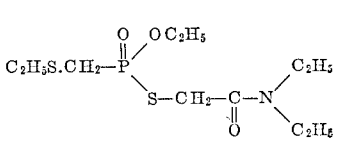

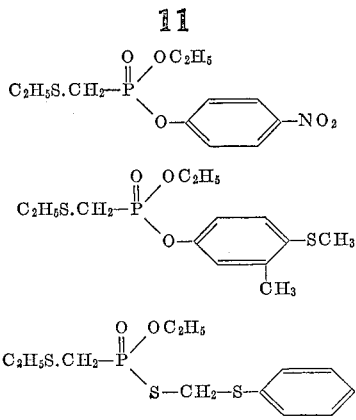

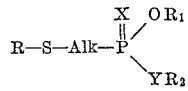

We claim:
1. A compound of the formula:

$$R-S-Alk-\underset{YR_2}{\overset{X}{\underset{\|}{P}}}\hspace{-4pt}\diagup\hspace{-4pt}\overset{OR_1}{}$$

wherein X and Y are chalcogen having an atomic number from 8 to 16, R and R₁ stand for lower alkyl having up to 4 carbon atoms, R₂ stands for a member selected from the group consisting of lower alkyl mercapto alkyl, phenyl mercapto alkyl, lower dialkyl amino alkyl, lower alkyl amino carbonyl lower alky, lower dialkyl amino carbonyl lower alkyl, chloro substituted phenyl, nitro substituted phenyl, lower alkyl substituted phenyl, lower alkyl mercapto substituted phenyl, lower alkyl mercapto-(lower alkyl) phenyl, chloro substituted benzyl, 3-chloro-4-methyl-7-coumarinyl and 4-methyl-7-coumarinyl and Alk stands for lower alkylene having up to 4 carbon atoms.

2. A compound of claim 1 wherein R₂ is lower alkyl mercapto-(lower alkyl)-phenyl.
3. A compound of claim 1 wherein R₂ is lower alkyl mercapto phenyl.
4. A compound of claim 1 wherein R₂ is nitro phenyl.
5. A compound of claim 1 wherein R₂ is chloro phenyl.
6. The compound of the formula:

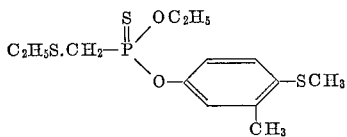

7. The compound of the formula:

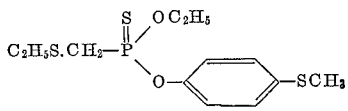

8. The compound of the formula:

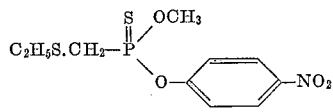

9. The compound of the formula:

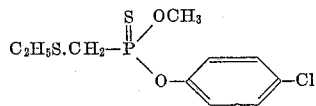

10. The compound of the formula:

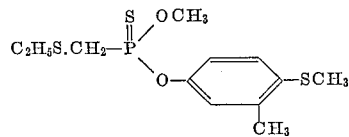

11. The compound of the formula:

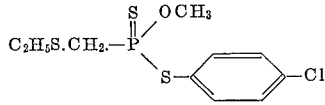

12. The compound of the formula:

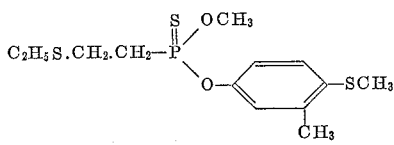

13. The compound of the formula:

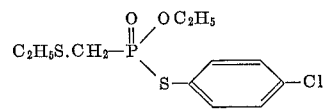

References Cited by the Examiner

UNITED STATES PATENTS

| | | | |
|---|---|---|---|
| 2,535,174 | 12/1950 | Tawney | 260—461 |
| 2,793,225 | 5/1957 | Scott | 260—461 |
| 2,831,014 | 4/1958 | Sallmann et al. | 260—461 |
| 2,963,505 | 12/1960 | Muhlmann et al. | 260—461 |
| 3,112,271 | 11/1963 | Calhoun | 260—461 |

FOREIGN PATENTS

| | | |
|---|---|---|
| 190,524 | 7/1957 | Australia. |
| 1,063,166 | 8/1959 | Germany. |

CHARLES B. PARKER, *Primary Examiner.*

ABRAHAM H. WINKELSTEIN, MORRIS LIEBMAN,
*Examiners.*